United States Patent
Song

(10) Patent No.: US 8,855,480 B2
(45) Date of Patent: Oct. 7, 2014

(54) CAMERA MODULE

(71) Applicant: Molex Incorporated, Lisle, IL (US)

(72) Inventor: Xiao Jun Song, Shanghai (CN)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 13/966,794

(22) Filed: Aug. 14, 2013

(65) Prior Publication Data

US 2014/0050469 A1 Feb. 20, 2014

(30) Foreign Application Priority Data

Aug. 14, 2012 (CN) ...................... 2012 2 0402862 U

(51) Int. Cl.
*G03B 17/00* (2006.01)
*G03B 17/12* (2006.01)

(52) U.S. Cl.
CPC ..................................... *G03B 17/12* (2013.01)
USPC .......................................... 396/176; 396/533

(58) Field of Classification Search
USPC ................................................ 396/176, 533
See application file for complete search history.

(56) References Cited

U.S. PATENT DOCUMENTS

| | | | |
|---|---|---|---|
| 7,457,061 B2 | 11/2008 | Sata et al. | |
| 7,815,475 B2 | 10/2010 | Peloza et al. | |
| 8,411,193 B2 | 4/2013 | Chiu | |
| 8,542,308 B2 * | 9/2013 | Ozawa et al. | 348/340 |
| 2008/0159734 A1 * | 7/2008 | Westerweck et al. | 396/541 |
| 2008/0267617 A1 * | 10/2008 | Huang et al. | 396/535 |
| 2010/0243844 A1 | 9/2010 | Peloza et al. | |

* cited by examiner

*Primary Examiner* — Clayton E Laballe
*Assistant Examiner* — Dennis Hancock
(74) *Attorney, Agent, or Firm* — Stephen L. Sheldon

(57) ABSTRACT

A camera module comprises an housing and at least two metal plating layers. The housing comprises a base and two platforms. The base includes a bottom surface, a top surface and an outer wall surface. A receiving hole configured to receive a lens device may be formed in the base, the receiving hole may pass through the base in a direction from the top surface to the bottom surface. The two platforms may be positioned above the top surface of the base and may have different heights. The metal plating layers extends on the outer wall surface of the base. A first end portion of each of the two metal plating layers extends to the top surface of the corresponding platform and the other end portion of the each metal plating layer extends to the bottom surface of the base.

12 Claims, 12 Drawing Sheets

CAMERA MODULE

RELATED APPLICATIONS

This application claims priority to Chinese Patent Application No. 201220402862.3, filed Aug. 14, 2012, which is incorporated herein by reference in its entirety.

FIELD OF THE PRESENT APPLICATION

The present application relates to a camera module.

BACKGROUND OF THE PRESENT APPLICATION

A lens actuator 1 in the prior art is disclosed in U.S. Pat. No. 7,457,061. The lens actuator 1 comprises a case 11, magnets 12, an inner yoke 13, an outer yoke 14, a coil 15, a carrier 16 and two terminals 17. The magnets 12, the inner yoke 13, the outer yoke 14, the coil 15 and the carrier 16 are all assembled in a receiving space defined by the case 11. The magnets 12 connect the inner yoke 13 and the outer yoke 14. The coil 15 is movable in a space defined between the inner yoke 13 and the outer yoke 14, and is fixed to a flange of the carrier 16, the carrier 16 can carry a lens, thus when a current flowing in the coil 15, the carrier 16 can move, and a focus of the lens can be adjusted.

The two terminals 17 are respectively assembled at opposite positions of the case 11. The coil 15 is soldered to the two terminals 17. An end portion of the terminal 17 is bent, is flattened against an upper surface of the case 11, the other end portion of the terminal 17 close to a lower surface of the case 11 is bent so as to be soldered to a circuit board. The circuit board can provide the current to the coil 15 via the terminals 17. As the two terminals 17 are separate components with respect to the case 11, additional manufacturing and assembling are required, so as to cause manufacturing of the lens actuator 1 to take more time and labour.

In some lens actuators in the prior art, the terminal is fixed to the case using an insert-mold process. A terminal fixed with insert-molding requires sufficient strength, thus the terminal must be large enough to provide the needed strength. The terminal with a large size tends to cause a volume of the case to become larger, and does not facilitate application of the lens actuator in thin type electronic devices. Thus, certain individuals would appreciate further improvements in a lens actuator

SUMMARY OF THE PRESENT APPLICATION

In view of above problems, the present application discloses a new camera module. The camera module comprises a housing and two metal plating layers. The housing includes a base and two platforms. The base comprises a bottom surface, a top surface and an outer wall surface. A receiving hole may be formed in the base, the receiving hole may pass through the base in a direction from the top surface to the bottom surface. The receiving hole can be configured to receive a lens device. The two platforms may be positioned above the top surface of the base and may have different heights. The two metal plating layers correspond to the two platforms. Each metal plating layer extends on the outer wall surface of the base. An end portion of the each metal plating layer extends to the top surface of the corresponding platform for electrically connecting the lens device, and the other end portion of the each metal plating layer extends to the bottom surface of the base. The camera module can uses the metal plating layer formed on the surface of the housing to electrically connect a lens device to a circuit board.

DESCRIPTION OF THE PREFERRED EMBODIMENTS

Hereinafter the embodiments of the present application will be described in details in combination with the drawings. It should be noted that the depicted camera module can uses the metal plating layer formed on the surface of the housing to electrically connect the lens device to the circuit board, therefore, the camera module requires no additional manufacturing of the electrode. Consequentially, the manufacturing of the camera module is improved.

Figure 1:
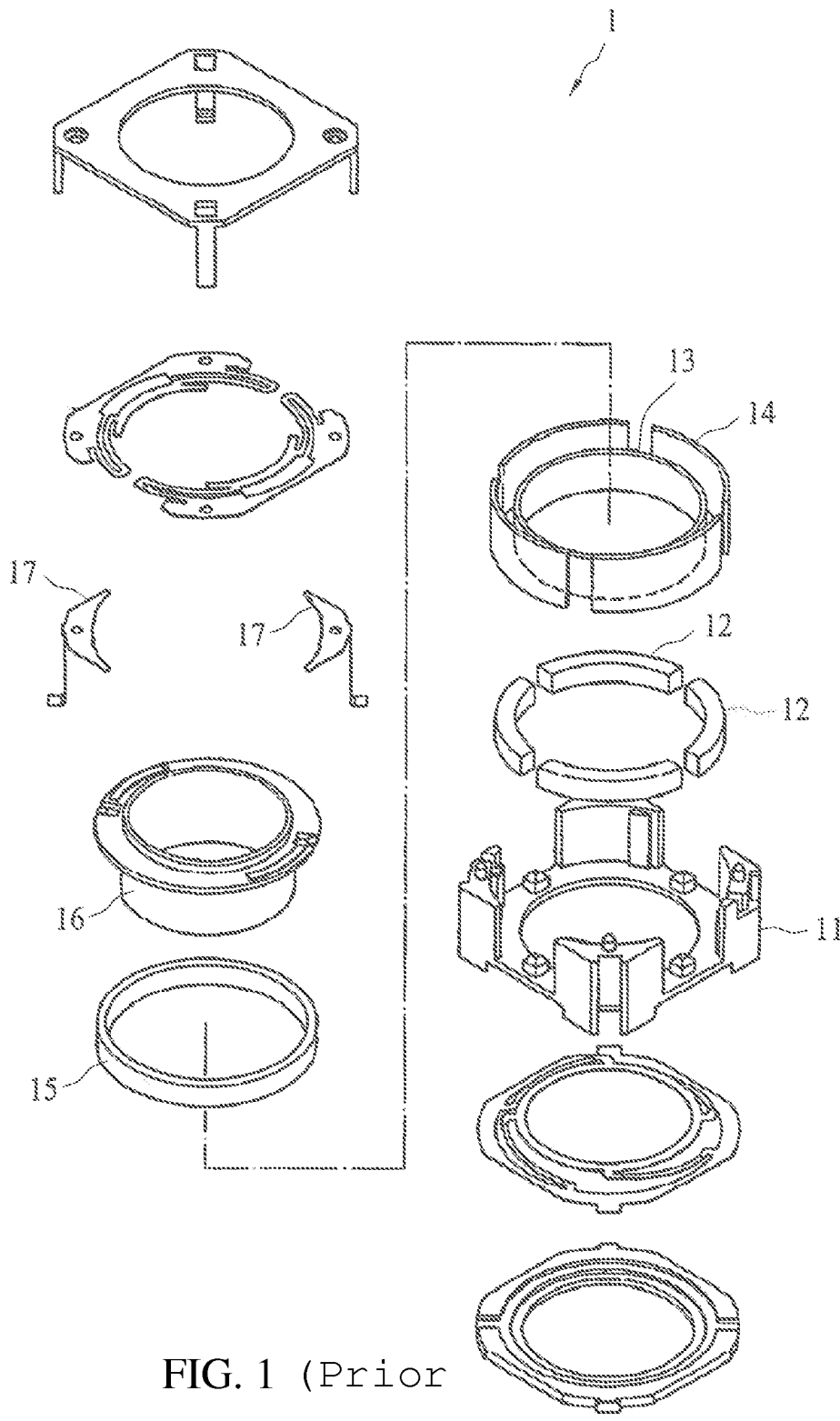
FIG. 1 is a view of a lens actuator in the prior art.
Figure 2:
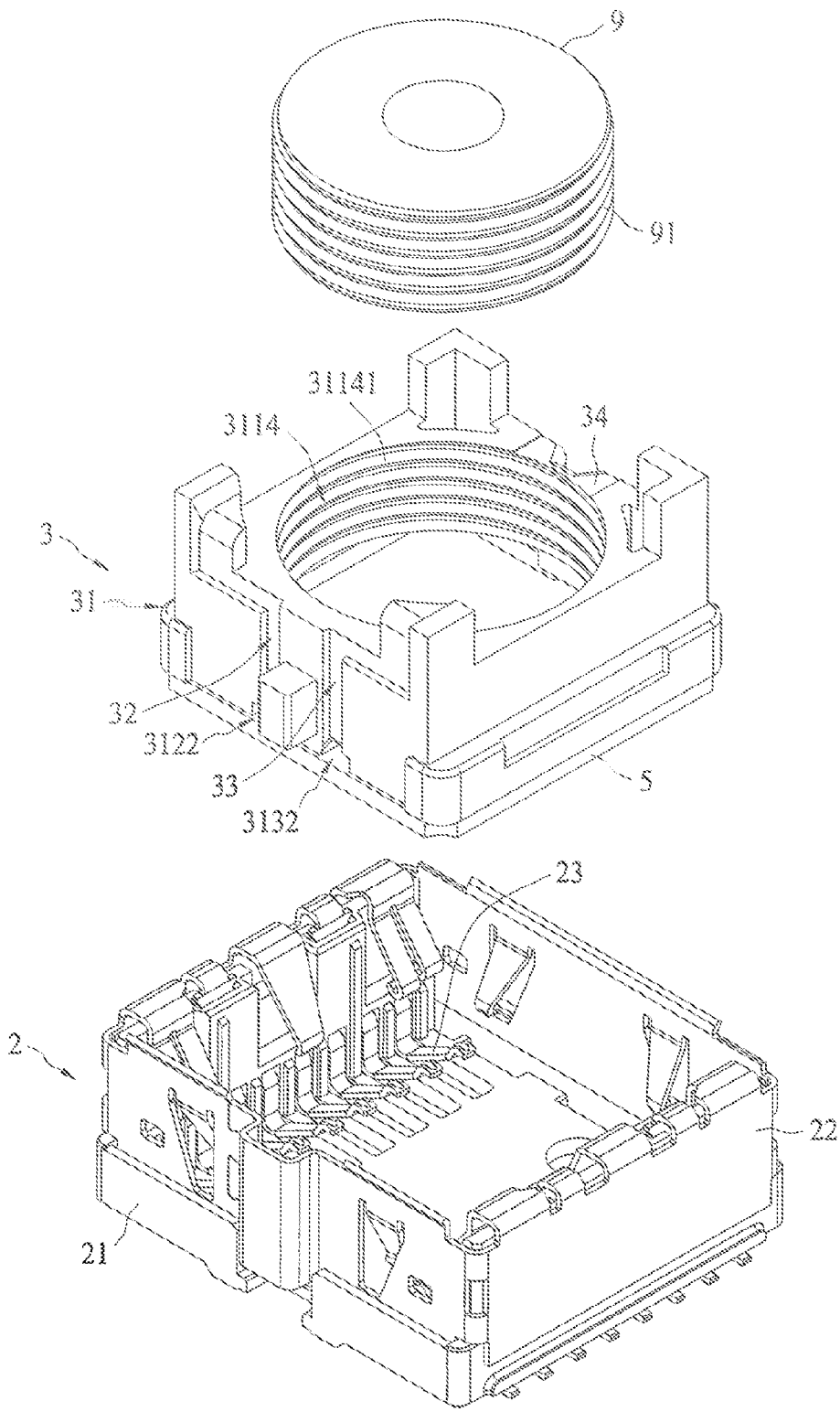
FIG. 2 is a perspective view illustrating an electrical connector and a camera module.
Figure 3:
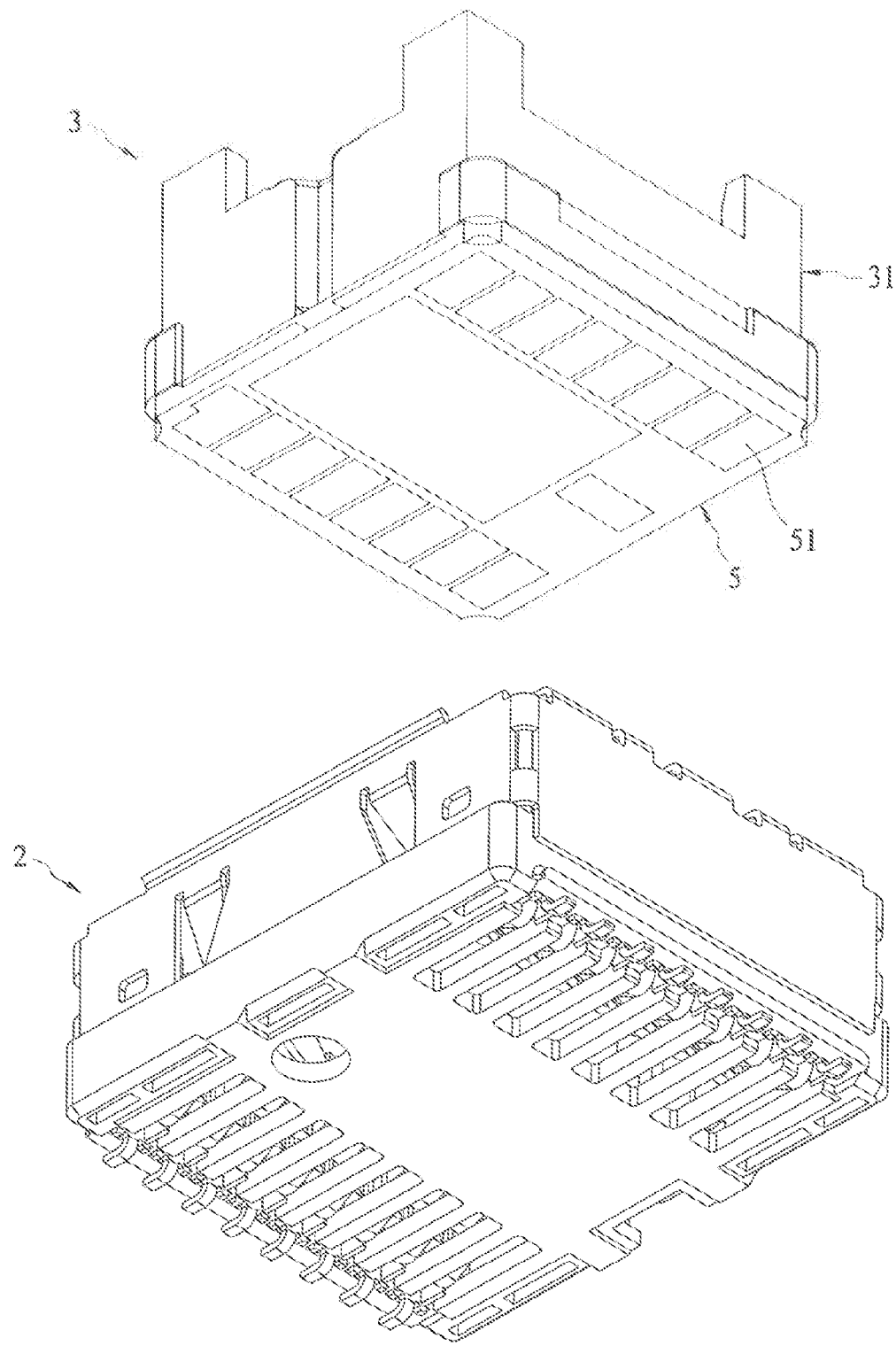
FIG. 3 is another perspective view illustrating the electrical connector and the camera module of FIG. 2.

FIG. 2 is a perspective view illustrating an electrical connector 2 and a camera module 3 in an embodiment of the present application. FIG. 3 is another perspective view illustrating the electrical connector 2 and the camera module 3 in the embodiment of the present application. Referring to FIG. 2 and FIG. 3, the camera module 3 is configured to receive a lens device 9, and can be assembled into the electrical connector 2, and is electrically connected to an electronic device equipped with the electrical connector 2 via the electrical connector 2.

The lens device 9 may comprises a lens and a lens actuator, the lens actuator is used for adjusting a focal length of the lens, the lens actuator can be electrically connected to the electronic device which is assembled with the lens actuator via the electrical connector 2 and the camera module 3.

Referring to FIG. 2 and FIG. 3, the electrical connector 2 comprises an housing 21, a metal shell 22, and a plurality of terminals 23. The metal shell 22 is sheathed to the housing 21, the terminals 23 are fixed to the housing 21. The housing 21 defines a receiving space, a contact portion of the terminal 23 protrudes into the receiving space, and a soldering portion of the terminal 23 is positioned outside the bottom of the housing 21 so as to be soldered to a circuit board.

Figure 4:
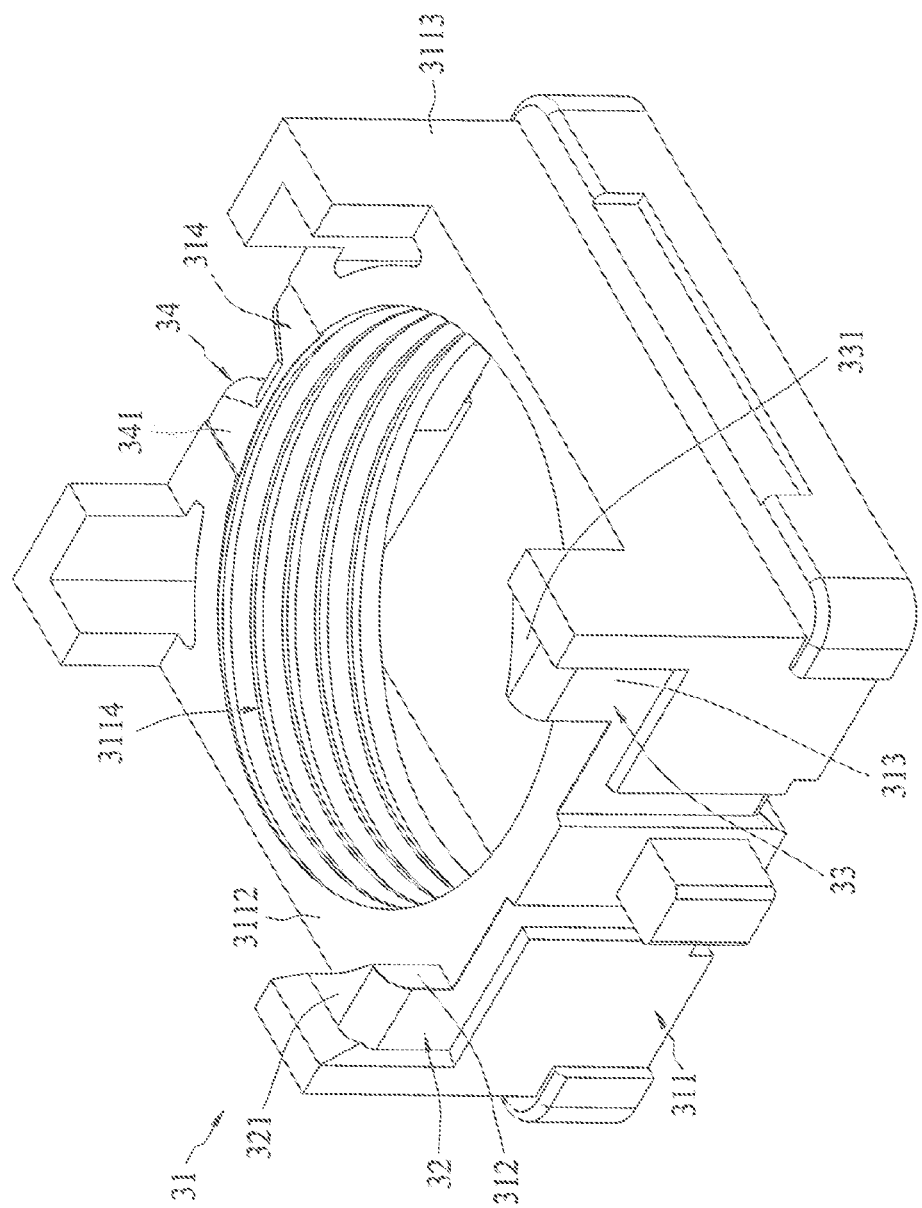
FIG. 4 is a perspective view illustrating a housing and metal plating layers of the camera module.
Figure 5:
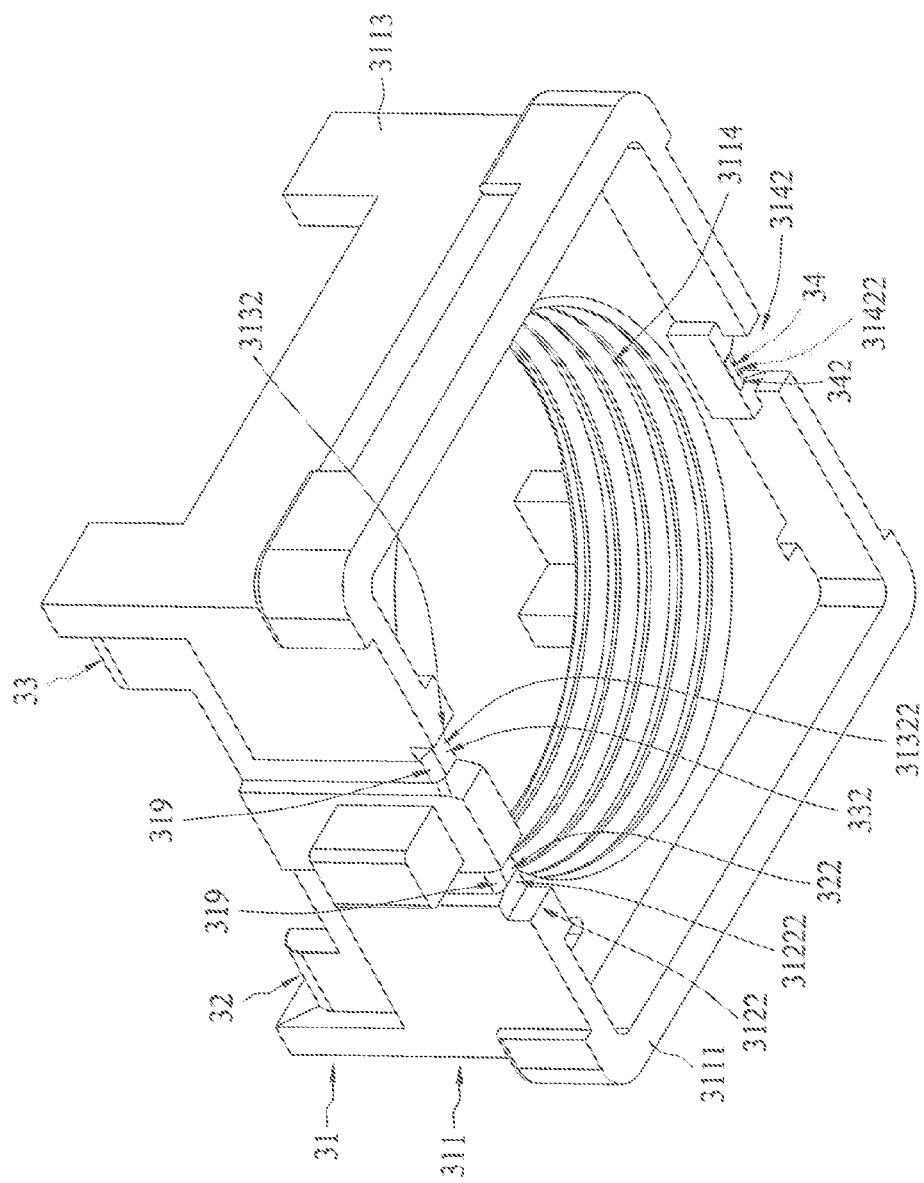
FIG. 5 is a perspective bottom view illustrating the housing and the metal plating layers of the camera module.
Figure 6:
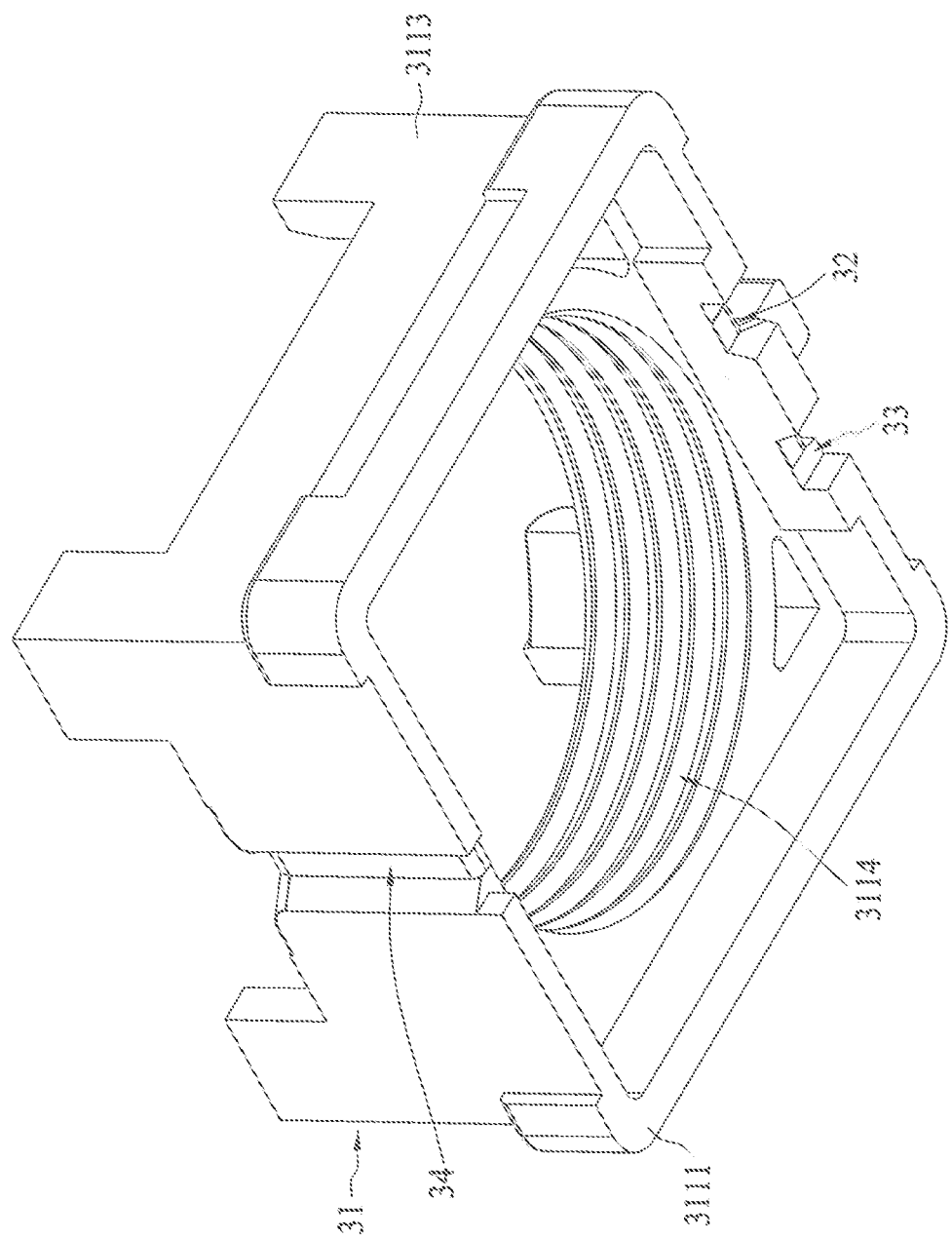
FIG. 6 is another perspective bottom view illustrating the housing and the metal plating layers of the camera module.
Figure 7:
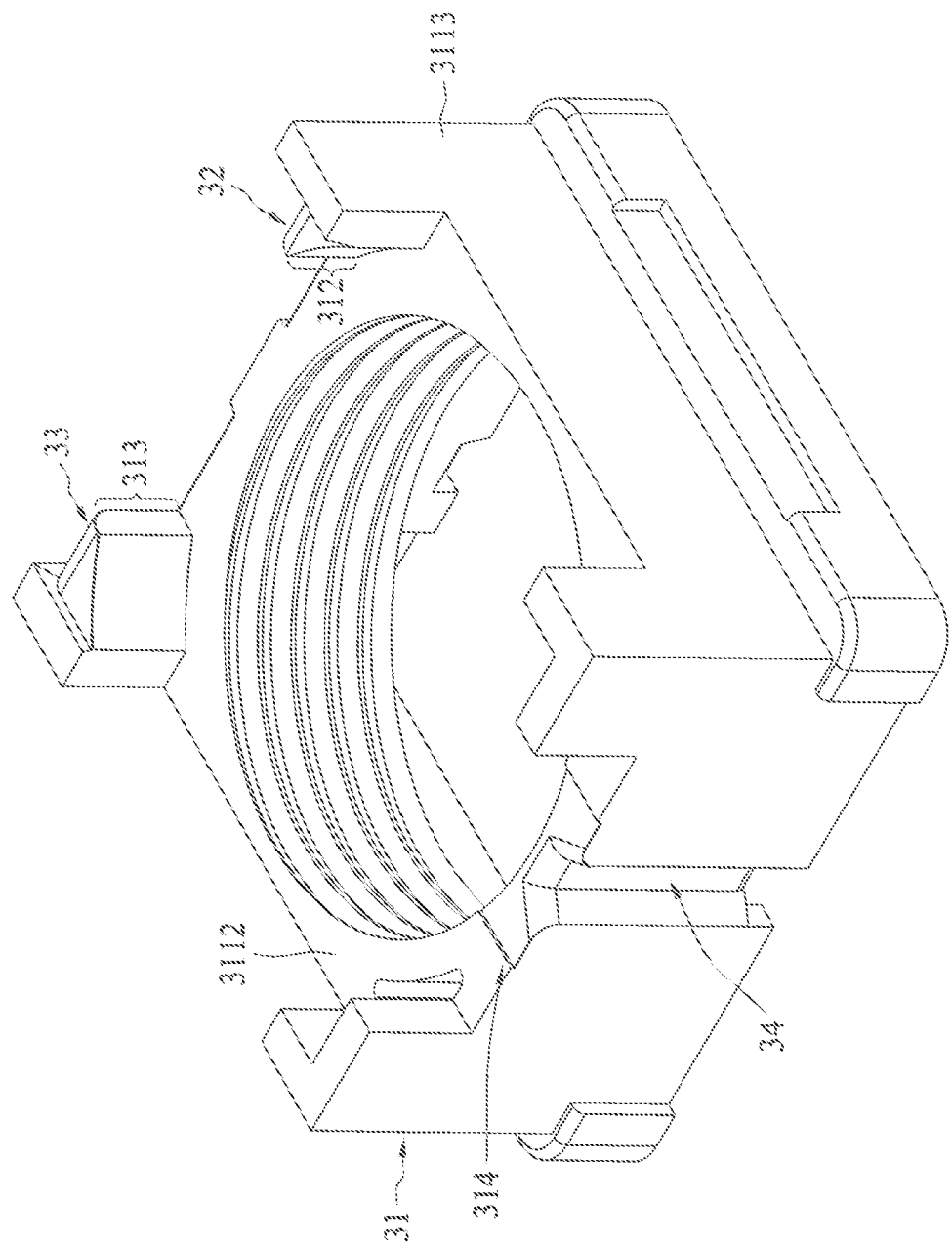
FIG. 7 is another perspective view illustrating the housing and the metal plating layer of the camera module.

FIG. 4 is a perspective view illustrating an housing 31 and metal plating layers 32-34 of the camera module 3 in an embodiment of the present application. FIG. 5 is a perspective view illustrating the housing 31 and the metal plating layers 32-34 of the camera module 3 in the embodiment of the present application viewed from the bottom of the housing 31. FIG. 6 is a perspective view illustrating the housing 31 and the metal plating layer 34 of the camera module 3 in the embodiment of the present application viewed from the bottom of the housing. FIG. 7 is a perspective view illustrating the housing 31 and the metal plating layer 34 of the camera module 3 of in the embodiment of the present application viewed from another angle. Referring to FIG. 4 and FIG. 7, the camera module 3 comprises an housing 31 and a plurality of metal plating layers (32, 33 and/or 34) which are formed along a surface or a contour of the housing 31.

The housing 31 may comprise a base 311 and a plurality of platforms (312, 313 and/or 314). The base 311 comprises a bottom surface 3111, a top surface 3112 and an outer wall surface 3113. A receiving hole 3114 may be formed in the base 311, the receiving hole 3114 passes through the base 311 in a direction from the top surface 3112 to the bottom surface 3111, the receiving hole 3114 may receive the lens device 9.

Referring to FIG. 2, in an embodiment, an outer side surface of the lens device 9 may be provided with a thread 91, and the receiving hole 3114 may be correspondingly formed as a screw hole with a thread 31141. In this way, the lens device 9 may be fixed by screwing into the receiving hole 3114.

Figure 9:
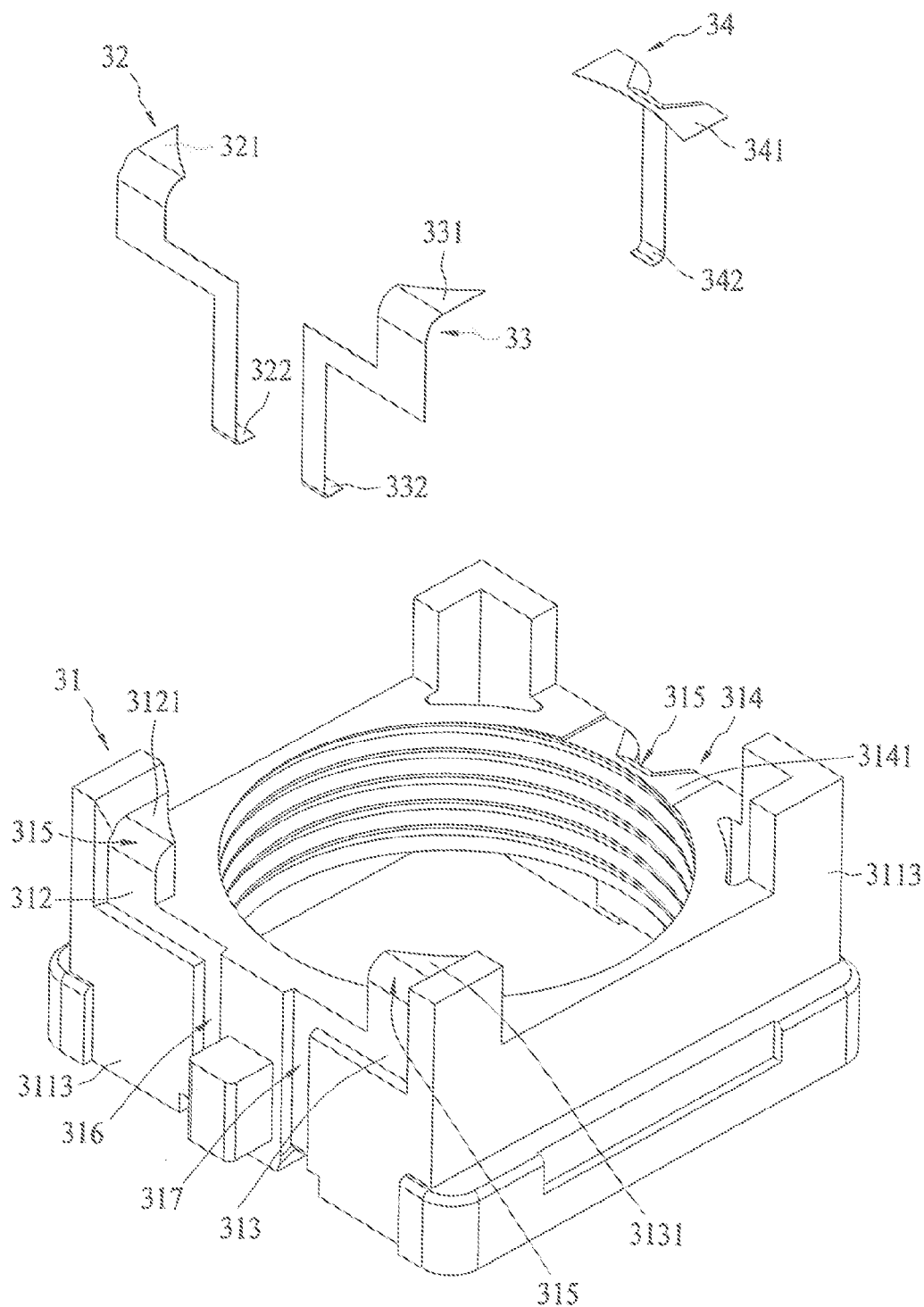
FIG. 9 is a perspective view illustrating the exploded housing and metal plating layers.

Referring to FIG. 7 and FIG. 9, a plurality of platforms (312, 313 and/or 314) are positioned on the top surface 3112 of the base 311, and may have different heights.

Referring to FIG. 4, FIG. 5, FIG. 9 and FIG. 10, the plurality of metal plating layers (32, 33 and/or 34) are formed corresponding to the plurality of platforms (312, 313 and/or 314). The metal plating layers (32, 33 or 34) extends on the outer wall surface 3113 of the base 311, and an end portion (321, 331 or 341) of each metal plating layer (32, 33 or 34) extends to the top surface (3121, 3131 or 3141) of the corresponding platform (312, 313 or 314) (FIG. 9), and the other end portion (322, 332 or 342) of the metal plating layer (32, 33 or 34) extends to the bottom surface 3111 of the base 311, the lens device 9 may be electrically connected to the end portion (321, 331 or 341) of the metal plating layer (32, 33 or 34). It should be noted that the housing may support two or more metal plating layers and can include a corresponding number of platforms.

Referring to FIG. 2, FIG. 3 and FIG. 5, in an embodiment the camera module 3 may further comprise a circuit board 5 and an image sensor (not shown in the Figures). The camera module 3 may be provided on the circuit board 5, and is electrically connected to the circuit board 5 by using the end portion (322, 332 or 342) of the metal plating layer (32, 33 or 34), thus power can be provided to the lens device 9 by the circuit board 5 via the metal plating layer (32, 33 and 34), so as to allow the lens of the lens device 9 to actuate. The image sensor can be provided on the circuit board 5, and is provided correspondingly to the receiving hole 3114 of the base 311. The lens can gather light and forms an image on the image sensor. A plurality of connection pads 51 are formed on the bottom of the circuit board. After the camera module 3 is assembled in the electrical connector 2, the connection pads 51 may contact the corresponding terminals 23.

The metal plating layer (32, 33 or 34) can be manufactured by a technology of molded interconnect device. In an embodiment, the housing 31 is made from a mixture of a high polymer material and a metal additive which is sensitive to laser, the resulting resin being insulative. The metal additive may be a metal complex or an organic metal complex. A pattern used for manufacturing the metal plating layer (32, 33 or 34) is formed on the platform (312, 313 and 314), the outer wall surface 3113 of the base 311 and the bottom surface 3111 of the base 311 by laser. The surface is irradiated and etched by laser to form shallow grooves, bottom surfaces of the shallow grooves are rough surfaces, and the metal additive is activated by irradiating of laser, produces physicochemical reaction and generates metal particles embedded in the rough bottom surfaces. These metal particles may be used as metal nuclei in a subsequent metal deposition process. After the pattern is formed by a laser, the housing 31 may be placed in a plating bath so as to plate a laser direct structuring metal layer as the metal plating layer (32, 33 or 34) on the shallow groove. Additional plating may be added on top of the initial plating layer if desired, the resulting combination of different platings being referred to as the plating layer for purposes of this application.

Figure 10:
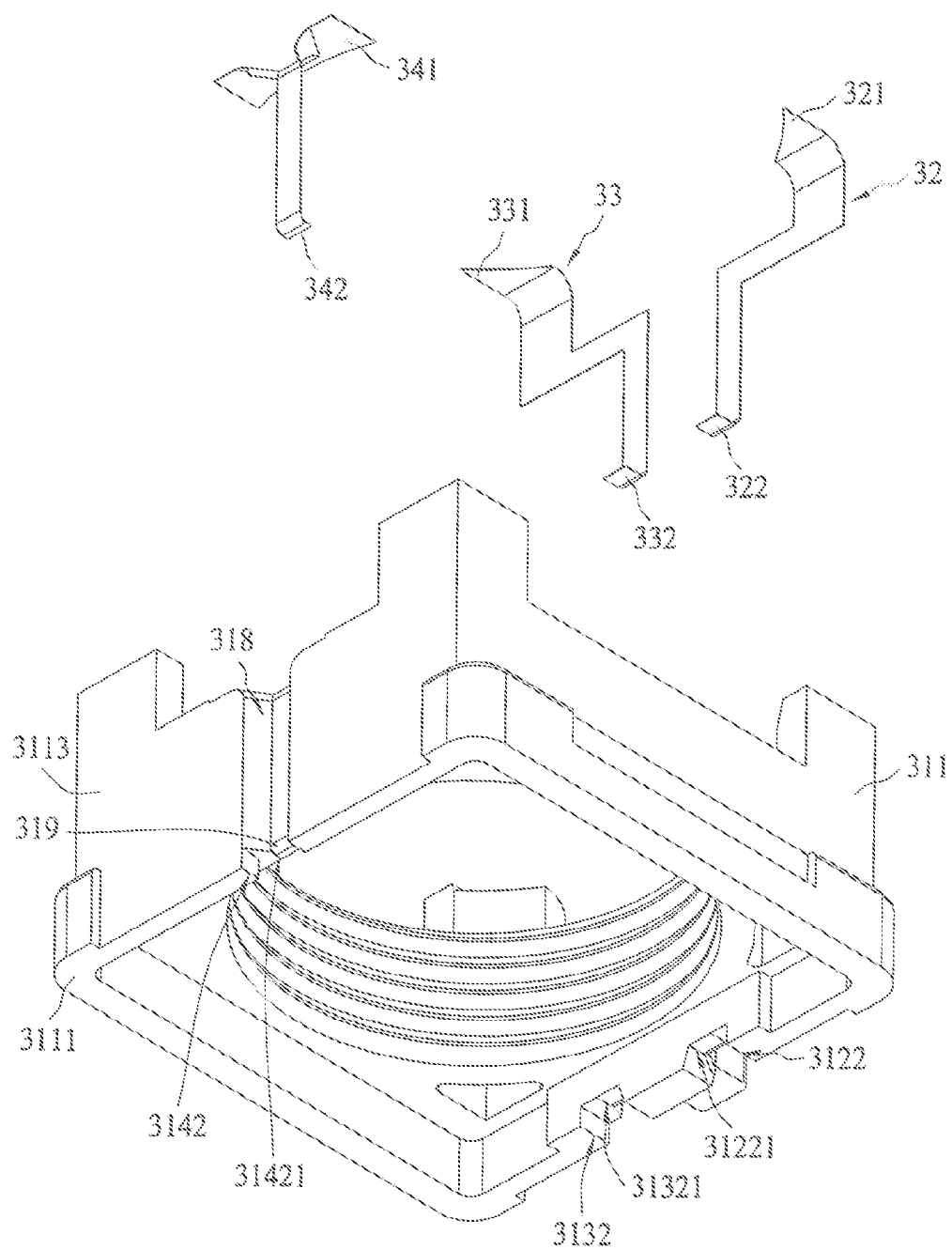
FIG. 10 is a perspective view illustrating the exploded housing and metal plating layers in an embodiment of the present application.

Referring to FIG. 9 and FIG. 10, the housing 31 may comprise a plurality of first curve faces 315, the plurality of first curve faces 315 correspond to the plurality of platforms (312, 313 and/or 314). Each first curve face 315 connects the top surface (3121, 3131 or 3141) of the corresponding platform (312, 313 or 314) and the outer wall surface 3113 of the base 311. A bending portion of the each metal plating layer (32, 33 or 34) extends on the corresponding first curve face 315. Compared with a right angle edge, metal is easily deposited on the first curve face 315, and the metal plating layer (32, 33 or 34) with a uniform thickness may be formed on the first curve face 315 by deposition so as to stabilize electrical signal transmission.

Referring to FIG. 9 and FIG. 10, in an embodiment, the housing 31 may further comprise a plurality of recessed grooves (316, 317 and 318), the plurality of recessed grooves (316, 317 and 318) correspond to the plurality of metal plating layers (32, 33 and 34) and are formed on the outer wall surface 3113 of the base 311, the metal plating layers (32, 33 or 34) extends in the corresponding recessed grooves (316, 317 or 318) and a top surface of the metal plating layer (32, 33 or 34) is positioned in the recessed grooves (316, 317 or 318) or the top surface of each metal plating layer (32, 33 or 34) is lower than two side walls of the recessed grooves (316, 317 or 318), thus after the camera module 3 is assembled into the electrical connector 2, the metal plating layers (32, 33 and 34) do not contact the metal shell 22.

Referring to FIG. 10, in an embodiment, the housing 31 may further comprise a plurality of recessed portions (3122, 3132 and 3142), the recessed portions (3122, 3132 and 3142) are provided corresponding to the plurality of metal plating layers (32, 33 and 34). The recessed portions (3122, 3132 and 3142) are formed in the bottom surface 3111 of the base 311 and the end portions (322, 332 or 342) of each metal plating layer (32, 33 or 34) extends into the corresponding recessed portion (3122, 3132 or 3142), as shown in FIG. 5.

Figure 11A:
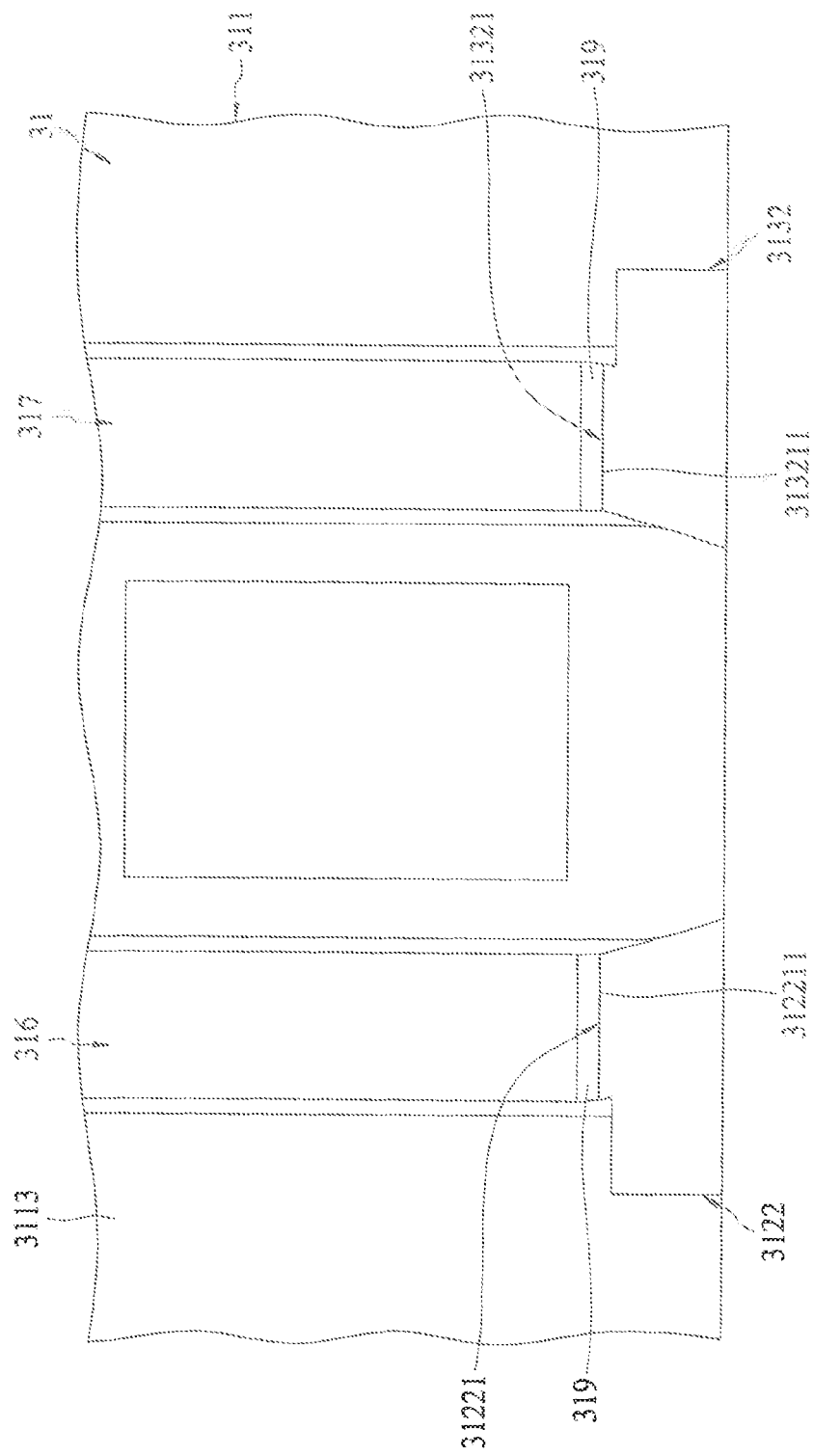
FIG. 11A illustrates recessed grooves in two recessed portions in an embodiment of the present application.
Figure 11B:
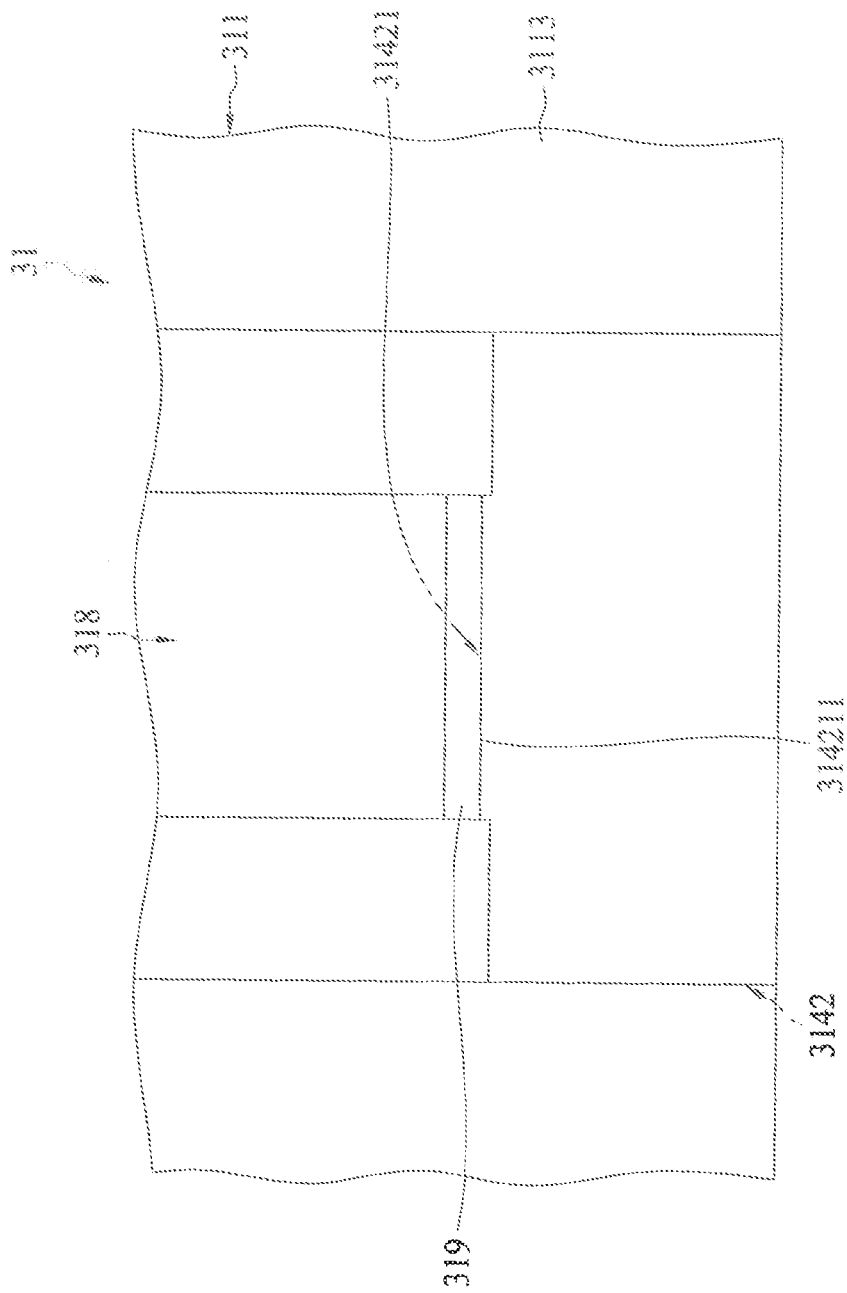
FIG. 11B illustrates a recessed groove in another recessed portion in an embodiment of the present application.

As shown in FIG. 2, the camera module 3 may be fixed on the circuit board 5. In an embodiment, the metal plating layers (32, 33 and 34) and a circuit layer of the circuit board 5 can be attached by using a conductive adhesive so as to fix the camera module 3 and electrically connect the metal plating layers (32, 33 and 34) to the circuit board 5. The conductive adhesive may be filled in the recessed portions (3122, 3132 and 3142) and the recessed portions (3122, 3132 and 3142) can increase the contact area between the conductive adhesive and the housing 31 so as to increase a retaining force of the camera module 3 to the circuit board 5. As shown in FIG. 11A and FIG. 11B, in an embodiment a recessed groove (31221, 31321 or 31421) is further formed in the each recessed portion (3122, 3132 or 3142) and the end portions (322, 332 or 342) of the each metal plating layer (32, 33 or 34) extends in the corresponding recessed groove (31221, 31321 or 31421).

Referring to FIG. 5 and FIG. 10, in an embodiment, the housing 31 further comprises a plurality of second curve faces 319, the second curve faces 319 corresponding to the plurality of recessed portions (3122, 3132 and 3142) or the metal plating layers (32, 33 and 34). Each second curve face 319 may connect the bottom surface (31222, 31322 or 31422) of the corresponding recessed portion (3122, 3132 or 3142) and the outer wall surface 3113 of the base 311. A bending portion of each metal plating layer (32, 33 or 34) extends on the corresponding second curve face 319. Similarly, compared with a right angle edge, metal is easily deposited on the second curve face 319 and the metal plating layer (32, 33 or 34) may be formed on the second curve face 319 by deposition and may have a uniform thickness so as to stabilize electrical signal transmission.

In another embodiment, as shown in FIG. 11A and FIG. 11B, the housing 31 includes second curve faces 319, the second curve faces 319 corresponding to the metal plating layers (32, 33 and/or 34), each second curve face 319 connecting the bottom surface (312211, 313211 and/or 314211) of the corresponding recessed groove (31221, 31321 or 31421) and the outer wall surface 3113 of the base 311 and each metal plating layer (32, 33 or 34) extends on the corresponding second curve face 319.

Figure 8:
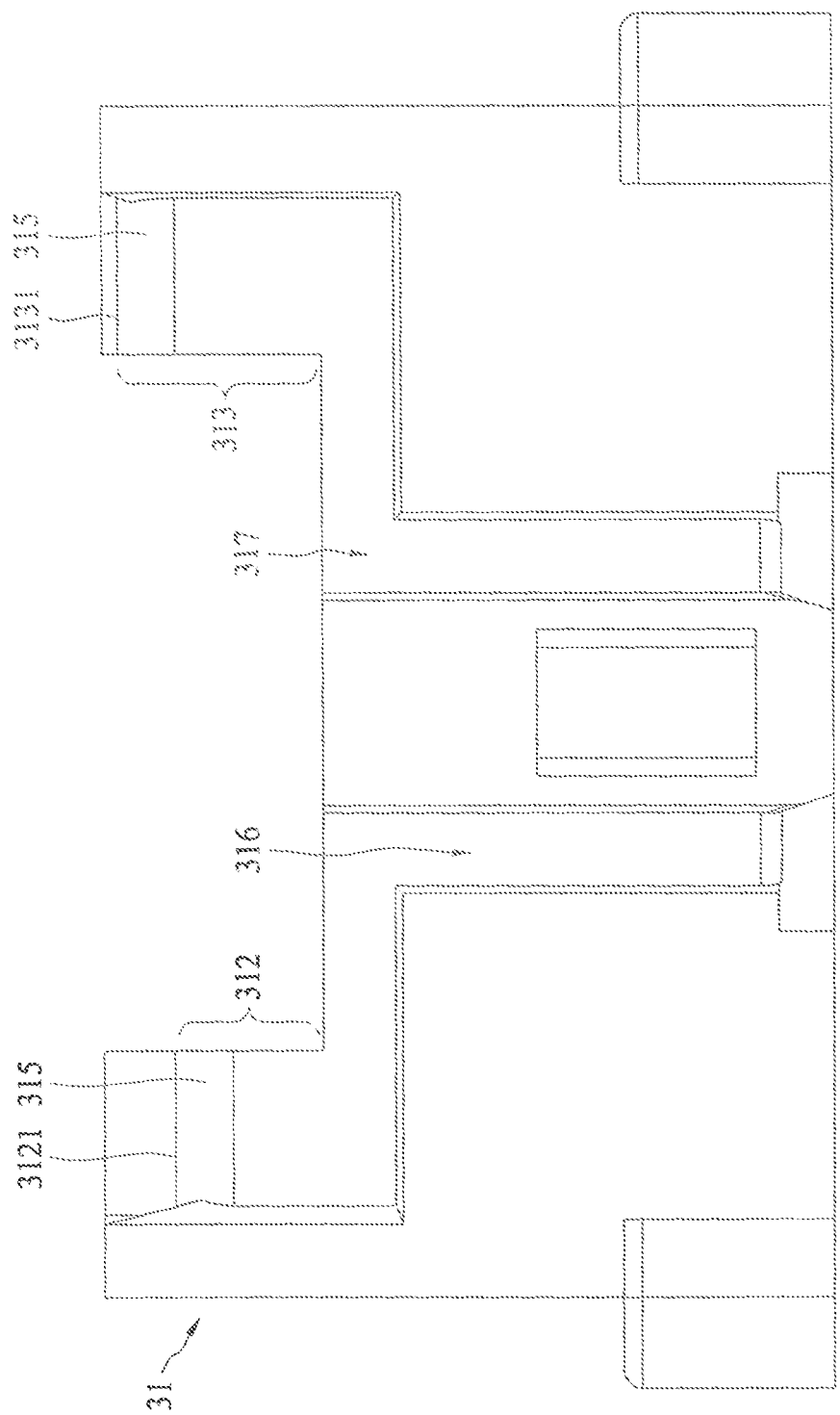
FIG. 8 is a front view illustrating platforms with different heights on the housing.

Referring to FIG. 7 and FIG. 8, the plurality of platforms (312, 313 and/or 314) are electrical connection contact points for performing on-off operation of the lens device 9. The plurality of platforms (312, 313 and/or 314) may have different heights. In the present embodiment, the housing 31 comprises three platforms which are a first platform 313, a second platform 312 and a third platform 314, the first platform 313 is higher than the platform 312, and the second platform 312 is higher than the third platform 314. The platforms (312, 313 and/or 314) with different heights selectively provide electrical connection contact points with different heights to the lens device 9. As can be appreciated, however, some other number of platforms can be provided.

A camera module includes a housing. The camera module is configured to receive a camera device and may be mounted on a circuit board provided with an image sensing device. A plurality of metal plating layers are formed on a surface of the housing, the plurality of metal plating layers can be used to selectively electrically connect the lens device to the circuit board. As the metal plating layers are formed on the surface of the housing, the volume of the housing can be kept small and the camera module is suitable for thin type electronic devices. The housing can include a plurality of platforms with different heights and an end portions of the metal plating layers can be respectively positioned on the corresponding platform. The use of platforms with different heights selectively provides electrical connection contact points with different heights for the lens device. The bending portion of the metal plating layer can be formed on the curve face, thus the bending portion of the metal plating layer may have a uniform thickness, so as to stabilize electrical signal transmission along the metal plating layer. The bottom of the housing comprises a plurality of recessed portions, and the metal plating layer extends in the recessed portion. When the housing is fixed on the circuit board with the conductive adhesive, the recessed portion can increase a contact area of the conductive adhesive, so as to firmly fix the housing on the circuit board. The metal plating layer may extend in the recessed groove, thereby avoiding short circuiting caused by contacting a metal shell of the electrical connector when the camera module is assembled into the electrical connector.

The above embodiments are used for illustrating principles and effects of the present application, but the present application is not limited to the above embodiments. Person skilled in the art may devise various modifications of above embodiments without departing from the spirit and scope of the present application and the protective scope of the claims. Therefore, the protective scope of the present application should be defined by the Claims of the present application.

What is claimed is:

1. A camera module, comprising:
a housing formed of an insulative material, the housing having a base with a bottom surface, a top surface and an outer wall surface, a receiving hole being formed in the base, the receiving hole passing through the base in a direction from the top surface to the bottom surface, the receiving hole being configured to receive a lens device;
two platforms positioned above the top surface of the base, each platform having a height above the top surface; and
two metal plating layers corresponding to the two platforms, each of the two metal plating layers extending on the outer wall surface of the base and having a first end and a second end, the first end portion of each of the two metal plating layers extending to the top surface of the corresponding platform and the second end portion of each of the two metal plating layers extending to the bottom surface of the base.

2. The camera module according to claim 1, wherein the housing includes two first curve faces, the two first curve faces corresponding to the two platforms, each of the first curve faces connecting the top surface of the corresponding platform and the outer wall surface of the base, and each of the two metal plating layers extending on the corresponding first curve face.

3. The camera module according to claim 2, wherein the housing comprises two recessed grooves, the two recessed grooves correspond to the two metal plating layers and being formed on the outer wall surface of the base, wherein each of the metal plating layers is positioned in one of the corresponding recessed grooves.

4. The camera module according to claim 3, wherein the housing comprises two recessed portions, the two recessed portions correspond to the two metal plating layers and being formed on the bottom surface of the base, the second end portion of each of the two metal plating layers extends into the corresponding recessed portion.

5. The camera module according to claim 4, wherein the housing comprises two second curve faces, the two second curve faces corresponding to the two metal plating layers, each of the second curve faces connecting the bottom surface of the corresponding recessed portion and the outer wall surface of the base and each of the two metal plating layers extending on the corresponding second curve face.

6. The camera module according to claim 4, wherein a recessed groove is formed in each recessed portion and the second end portion of the each metal plating layer extends in the recessed groove of the corresponding recessed portion.

7. The camera module according to claim 6, wherein the housing comprises two second curve faces, the two second curve faces correspond to the two metal plating layers, each of the second curve faces connecting the bottom surface of the recessed groove of the corresponding recessed portion and the outer wall surface of the base, and each of the metal plating layers extending on the corresponding second curve face.

8. The camera module according to claim 1, wherein the housing comprises two recessed portions, the two recessed portions corresponding to the two metal plating layers and being formed on the bottom surface of the base, the second end portion of each of the metal plating layers extending into the corresponding recessed portion.

9. The camera module according to claim 8, wherein the housing comprises two second curve faces, the two second curve faces correspond to the two metal plating layers, each of the second curve faces connecting the bottom surface of the corresponding recessed portion and the outer wall surface of the base, and each of the metal plating layers extending on the corresponding second curve face.

10. The camera module according to claim 1, wherein the each metal plating layer is a laser direct structuring metal layer.

11. The camera module according to claim 1, wherein the receiving hole is a screw hole.

12. The camera module according to claim 1, wherein each of the heights is different.

* * * * *